N. D. CLARK.
Ore Washer.
No. 46,641. Patented Mar. 7, 1865.
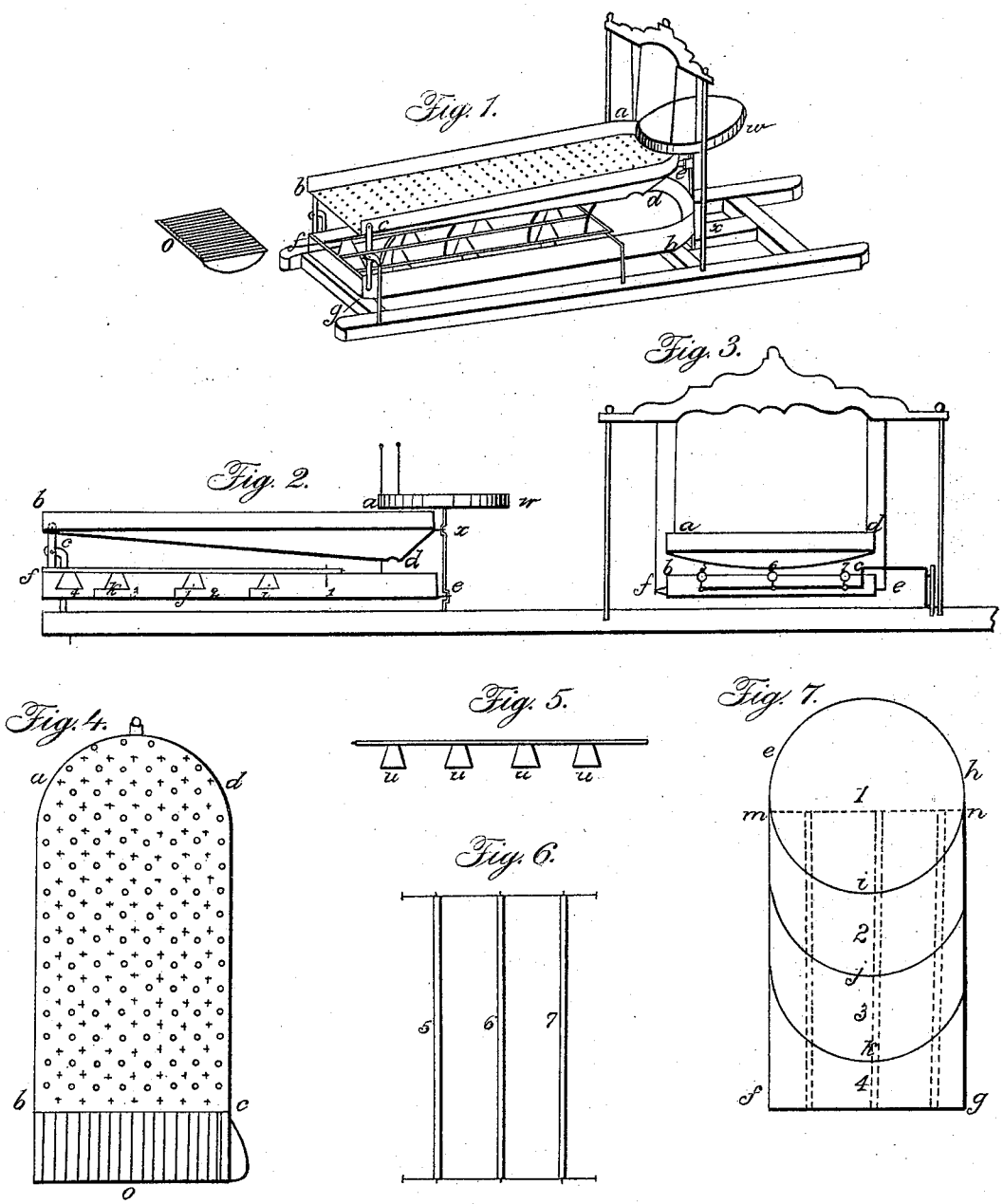
Witnesses:
Geo. F. Steel
Joseph Montgomery
Inventor:
N. D. Clark

UNITED STATES PATENT OFFICE.

N. D. CLARK, OF BENTONSPORT, IOWA.

IMPROVED GOLD-WASHER.

Specification forming part of Letters Patent No. 46,641, dated March 7, 1865; antedated March 3, 1865.

*To all whom it may concern:*

Be it known that I, N. D. CLARK, of Bentonsport, in the county of Van Buren and State of Iowa, have invented a new and useful Machine for Washing Gold, which I propose to call the "Gold-Hunter;" and I do hereby declare that the following is a full, clear, and exact description of the construction and operation of the same, reference being had to the annexed drawings, making a part of this specification, in which—

Figure 1 is a perspective view, Fig. 2 a longitudinal sectional elevation, Fig. 3 a transverse section, Fig. 4 a plane view, of the upper pan or separator; Fig. 5, a side view of a detached portion of the agitator, of which Fig. 6 is a plane view; Fig. 7, a plane view of the lower or gold pan with the agitator laid aside; Fig. 8, a contrivance to work the agitator.

$a\ b\ c\ d$ is a pan of any required dimensions—say, four feet long, two feet wide, and six inches deep—open at one end, $b\ c$. In general I make this pan of sheet-iron, the bottom of what is commonly called "tom-iron," perforated with holes, the number and size of which vary according to circumstances. A part of these holes—say every alternate row—I punch in the usual way, from the upper side downward, with a common round punch. The others I punch through in the opposite direction—that is, from the under side upward—with a square or three-cornered punch with an obtuse point, so as to throw a spur on the upper side. I also provide this pan with a second bottom, either attached or separate, Figs. 1 and 2, the dark shade, $c\ d$, made hollowing or inclined from the sides inward to the point $d$, where there is an opening downward. I also attach to the open end of this pan a series of elastic strips, inclined a little edgewise, so as to leave open spaces between them, with a spout under them, as shown at $o$, Fig. 1, attached as at $b\ c$, Fig. 4. $e\ f\ g\ h$ is another pan, of the same dimensions as the one already described, it being most convenient in case of working them together to have them the same size. I make the bottom of this pan rough or uneven by a series of indentations or otherwise. I also divide it off into sections by inserting strips edgewise from side to side across the bottom, either curved like the rim of a common pan, as shown at $i\ j\ k$, Fig. 7, or otherwise formed, and fastened to the sides and bottom. The width of these strips is equal to any required depth of the sections thus formed—say an inch and a half. I also provide this pan with an agitator, Fig. 6, in which 5 6 7 are rollers, connected together with cross-pieces at the ends, so that they will turn on their axes, and fastened to the pan in the relative position shown by the dotted lines, Fig. 7, at the points $m\ n\ f\ g$ by means of thumb-screws or otherwise, so that it can be raised or lowered at pleasure. To the under side of each of said rollers I fix the paddles $u\ u\ u\ u$ and the lever $v$, Fig. 5. I connect said levers $v\ v\ v$, Fig. 8, (which is a transverse section of the agitator,) to the coupling-bar $s\ t\ z$ by means of joints at 9 9 9. I also connect said coupling-bar to the pillar $p\ y$ by means of the connecting-rod $z\ p$, with joints at $z$ and $p$. I suspend these pans as represented in the accompanying drawings, or in any way so that they will be free to obey the impulse of the cranks $e\ x$ on the vertical shaft, which may be propelled by any of the known propelling forces—as the water-wheel $a\ w$—so situated that the water as it escapes from the wheel will be directed into the pans, thus using the same water for washing the dirt that has been used as a motive power.

As I have briefly described the construction of my invention, I will proceed to describe its operation.

*Operation of the upper pan or separator:* Suppose the machine to be in operation, the ends of the pans immediately connected with the cranks moving round and round in small circles, the opposite ends partaking of a kind of parallel motion, which in general should be sufficiently vigorous to cause the dirt to slide about a little in the pans. Suppose the pay-dirt to be thrown into the upper pan or separator where the water from the wheel will pour directly upon it, a separation immediately takes place between the fine particles, which pass through the holes, fall on the second bottom, where they are collected together and discharged through the opening $d$ into the lower or gold pan, and the coarse gravel and stones, which cannot pass through the holes, but are carried forward by the action of the machine and thrown out upon the appendage $b\ c\ c$, Fig. 4, where another partial separation takes place. The stones that are too large to insinuate themselves between the inclined edges of the elastic slips pass on and escape at $r$, while those that are small enough or heavy enough to force their way through between the yielding slips pass into the spout and are thrown out at one side, where the workmen will please examine for nuggets. Some of the agencies which combine to facilitate this process of separation are these, viz.: first, the sifting motion of the pan, which is a most important element in the combination; second, the mixing of the water with the dirt, which renders the whole mass mobile and washes the dirt down; third, the trundling or jolting effect of the stones, which are thrown in among the dirt and are acted upon on their under sides by the little protuberances or spurs in such a way as to keep them constantly rolling and tumbling about, thus producing a kind of undulatory motion in the bottom of the pan and effectually preventing the holes from becoming closed up; fourth, these same spurs or upturned points also assist greatly in tearing to pieces and reducing any lumps of clay or other adhesive matter that may be found among the pay-dirt.

*Operation of the lower or gold pan:* As all the dirt enters this pan at one end and escapes at the other, all is alike exposed to the agencies employed to precipitate the gold to the bottom, for I regard the superior gravity of gold as a fundamental principle in all methods of gold-washing, therefore any principle or combination of principles that will facilitate in separating and precipitating the gold to the bottom and retaining it there is a good thing. Then the first important object to be attained is to secure in as high a degree as possible a mobile condition of the contents of the pan, so that the particles of matter composing the different ingredients of the pay-dirt may effect a change of place with the greatest possible facility and arrange themselves according to their different degrees of density, (in the following order, beginning at the bottom,) viz.: gold, black sand, gray sand, mud, and water. Then nothing remains to be done but to throw off the worthless matter and retain the valuable. That is just what my gold-pan is in an eminent degree successful in accomplishing. The dirt enters the pan in a highly mobile condition, being thoroughly mixed with the water as it issues from the separator, and before it can settle to the bottom it is acted upon in such a way as to keep it in a state of constant ebullition or undulatory motion, communicated to it from the bottom of the pan. As the dirt slides about in the pan those particles on the bottom rise and fall in rapid succession. As they ascend and descend the gently-sloping sides of the little elevations on the bottom of the pan these in their turn act on those above them and so on to the surface. In this way the whole contents of the pan, from bottom to surface, are kept so light and free, that it would be odd if any particles of gold, however small or attenuated, should fail to reach the bottom. Yet in order to make sure work of it in washing where the gold is of a character designated by the miners as "float-gold," I pour quicksilver into one or more of the sections of my gold-pan—say 3 and 4—and lower the paddles of the agitator which operate in those sections until they reach the surface of the quicksilver. The paddles skim off the oily scum, so much complained of by the miners, and keep a pure metallic surface constantly exposed to any particles that may be thrown down by their mechanical action. A further use of the agitator is to prevent the pan from filling too full by mixing the surface dirt with the water, which, as it moves forward to the open end $fg$ where it escapes, arrices the dirt along with it.

In washing quartz-dirt as it issues from the mortar-boxes of the quartz mill the separator is not needed. The gold-pan in this case may be lined with copper amalgamated with quicksilver on the inner surface, a little quicksilver poured in, and the agitator lowered to the surface, as above suggested.

My pan is not a riffle, nor is it constructed on the principle of a riffle. In all riffles, so far as I am acquainted with their nature, we depend upon the direct force of the current to carry the dirt forward and leave the gold in little eddies caused by interruptions in the current. Not so with my pan. the agitator operates in such a way as to render useless such a current as is necessary in a riffle. I work my pan on an exact level, or inclined a little back, so as to have slack-water in the pan in order to avoid a current, thereby providing against all danger of wasting the gold.

The following are some of the distinguishing features of my machine: First, it is durable; second, it is portable; third, it saves the gold; fourth, it is adapted to all kinds of mining, either with or without quicksilver; fifth, it economizes water, only a little more than what will wet the dirt being necessary; sixth, it economizes labor in sluicing, the hand employed to tend sluice is not needed in washing with my machine, it can always be worked on a level with the bed-rock or tail-ditch, so that the labor of throwing in the dirt is small when compared with that of sluicing, where, in order to get the requisite fall, the head of the sluice must be so elevated as to be very inconvenient getting the dirt into it; seventh, it also economizes time, it being necessary to clean up only at indefinite periods, and then it is only the work of a few seconds to remove, empty, and replace the gold-pan, &c.

What I claim, separately, as my invention, and desire to secure by Letters Patent, is—

1. The principle of working a gold-pan, made substantially as herein described, on an exact level or inclined a little back in order to avoid a rapid current, by first producing a highly mobile condition of the contents of the pan, that the particles of matter composing the different ingredients of the pay-dirt may from the slightest impulse effect a change of place; then, second, by producing a lively undulatory or waving motion, communicated from the bottom of the pan, they obey the laws of gravity and arrange themselves according to their different degrees of density substantially as follows, beginning at the bottom: Gold, black sand, gray sand, mud, and water at the surface and as a medium pervading the whole, thus securing a separation of the gold from the dirt and precipitating it to the bottom of the pan; and, lastly, by throwing off the worthless matter by applying agitation to the surface.

2. In the application to gold-pans of a bottom marked with a series or assemblage of little elevations on the inner surface, formed by means of indentations in the outer surface or otherwise produced, calculated to produce undulatory motion from bottom to surface throughout the contents of the pan.

3. The providing of the upper surface of the bottoms of separators (used in preparing the dirt for further washing) with pointed protuberances or spurs by punching part of the holes through in the direction of the upper surface with an angular punch having an obtuse point, calculated to tear in pieces and reduce adhesive substances and to act upon the stones in such a way as to cause them to roll and tumble about.

4. In combination is, first, the providing of a separator, for the above-described purpose, with a series of elastic slips attached to the open end, to serve in separating nuggets from among the stones; second, the providing of a separator (as above) with a second bottom, made hollowing or inclined from the sides inward to some point where there is an opening downward, to serve in collecting and discharging the dirt at one place; third, the providing of the above-described separator and gold-pan with a sifting or oscillating motion; fourth, the double use of the water, first, as a propelling force and then to wash the dirt.

N. D. CLARK.

Witnesses:
GEO. T. STEEL.
JOSEPH MONTGOMERY.